US009811573B1

(12) United States Patent
Xiang et al.

(10) Patent No.: US 9,811,573 B1
(45) Date of Patent: Nov. 7, 2017

(54) LINEAGE INFORMATION MANAGEMENT IN DATA ANALYTICS

(71) Applicant: EMC Corporation, Hopkinton, MA (US)

(72) Inventors: Dong Xiang, Shanghai (CN); Stephen Todd, Shrewsbury, MA (US); Qiyan Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 260 days.

(21) Appl. No.: 14/039,537

(22) Filed: Sep. 27, 2013

(51) Int. Cl.
G06F 17/30 (2006.01)
(52) U.S. Cl.
CPC .............................. G06F 17/30557 (2013.01)
(58) Field of Classification Search
CPC . H04L 43/08; H04L 29/08144; H04L 41/147; H04L 9/3247; G06F 2201/815; G06F 2201/885; G06F 2209/5019; G06F 2209/501; G06F 11/3409; G06F 11/3452; G06F 17/3071; G06Q 10/06
See application file for complete search history.

(56) References Cited

U.S. PATENT DOCUMENTS

| 6,434,295 | B1 * | 8/2002 | MacCormack | H01S 3/067 385/27 |
| 6,978,259 | B1 * | 12/2005 | Anderson | G06F 3/0605 706/19 |
| 7,571,069 | B1 * | 8/2009 | Farkas et al. | 702/120 |
| 7,640,342 | B1 * | 12/2009 | Aharoni | G06F 3/0605 370/237 |
| 8,510,836 | B1 * | 8/2013 | Nachenberg | H04L 63/145 706/12 |
| 2003/0225768 | A1 * | 12/2003 | Chaudhuri et al. | 707/10 |
| 2007/0083500 | A1 * | 4/2007 | Zibitsker | G06F 9/5083 |
| 2007/0143246 | A1 * | 6/2007 | Bestgen et al. | 707/2 |
| 2007/0198750 | A1 * | 8/2007 | Moilanen | 710/6 |
| 2008/0022285 | A1 * | 1/2008 | Cherkasova | G06F 9/505 718/104 |

(Continued)

FOREIGN PATENT DOCUMENTS

GB 2456894 A * 8/2009 .......... G06F 11/3452

OTHER PUBLICATIONS

Examining performance differences in workload execution phases, Cook et al, IEEE International workshop on workload characterization, pp. 82-90, 2001.*

(Continued)

Primary Examiner — Augustine K Obisesan
(74) Attorney, Agent, or Firm — Ryan, Mason & Lewis, LLP

(57) ABSTRACT

A data analytics workload is obtained, wherein the data analytics workload includes one or more execution parameters and an input data set. An identifier specific to the data analytics workload is generated. The data analytics workload is at least partially executed based on the one or more execution parameters and the input data set to generate an output data set. Meta data associated with the output data set generated by execution of the data analytics workload is obtained, wherein the meta data includes lineage information corresponding to the output data set generated by execution of the input data set. The meta data is registered in a meta data store.

17 Claims, 5 Drawing Sheets

(56) References Cited

U.S. PATENT DOCUMENTS

| | | | | |
|---|---|---|---|---|
| 2008/0161885 A1* | 7/2008 | Hsu | ......................... | G06F 3/061 |
| | | | | 607/60 |
| 2009/0265712 A1* | 10/2009 | Herington | ............. | G06F 9/5077 |
| | | | | 718/103 |
| 2011/0022586 A1* | 1/2011 | Wilkinson et al. | ........... | 707/720 |
| 2012/0131593 A1* | 5/2012 | DePetro | ........................ | 718/105 |
| 2012/0179990 A1* | 7/2012 | Curbera | ............ | G06F 17/30312 |
| | | | | 715/771 |
| 2012/0198073 A1* | 8/2012 | Srikanth | ............... | G06F 9/5027 |
| | | | | 709/226 |
| 2012/0297145 A1* | 11/2012 | Castillo | ............... | G06F 12/0868 |
| | | | | 711/138 |
| 2013/0332423 A1* | 12/2013 | Puri | .................. | G06F 17/30309 |
| | | | | 707/687 |
| 2014/0122387 A1* | 5/2014 | Chi et al. | ........................ | 706/12 |

OTHER PUBLICATIONS

Optimizing analytical data flows for multiple execution engines, Simitsis et al, Proceedings of the 2012 ACM SIGMOD International Conference on Management of Data, pp. 829-840, 2012.*

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

LINEAGE INFORMATION MANAGEMENT IN DATA ANALYTICS

FIELD

The field relates to information processing, and more particularly to information processing techniques for managing lineage information in a data analytics environment.

BACKGROUND

The analysis of massive amounts of data is becoming a routine activity in many commercial and academic organizations. However, analyzing these data sets may require processing tens or hundreds of terabytes of data. Such large data sets have become known as "big data." A data set characterized as big data is prohibitively large such that, for example, it is beyond the capabilities of commonly used software tools to manage/process the data, or at least to do so within a reasonable time frame.

Existing big data analtyics and management solutions, however, typically tend to focus only on scalability and reliability related issues. Thus, there is a need for improved data analytics and management techniques, in general, and in the context of big data applications.

SUMMARY

Embodiments of the present invention provide information processing techniques for generating and managing lineage information in a data analytics and management system.

For example, in one embodiment, a method comprises the following steps. A data analytics workload is obtained, wherein the data analytics workload comprises one or more execution parameters and an input data set. An identifier specific to the data analytics workload is generated. The data analytics workload is at least partially executed based on the one or more execution parameters and the input data set to generate an output data set. Meta data associated with the output data set generated by execution of the data analytics workload is obtained, wherein the meta data comprises lineage information corresponding to the output data set generated by execution of the input data set. The meta data is registered in a meta data store.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor operatively coupled to the memory and configured to perform steps of the above-described method.

Advantageously, illustrative embodiments of the invention implemented in a big data analytics and management system store and manage lineage information associated with data generated by the system. This enables, inter alia, the ability to trace connections between data. Such lineage information may, for example, be used in one or more of a data provenance function, a data de-duplication function and a data analytics workload scheduling function.

These and other features and advantages of the present invention will become more readily apparent from the accompanying drawings and the following detailed description.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual and/or physical infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "enterprise" refers to a business, company, firm, venture, organization, operation, concern, corporation, establishment, partnership, a group of one or more persons, or some combination thereof.

As used herein, the term "meta data" refers to data about other data. For example, meta data can describe or otherwise represent one or more attributes, features and/or conditions about other data.

Figure 1:
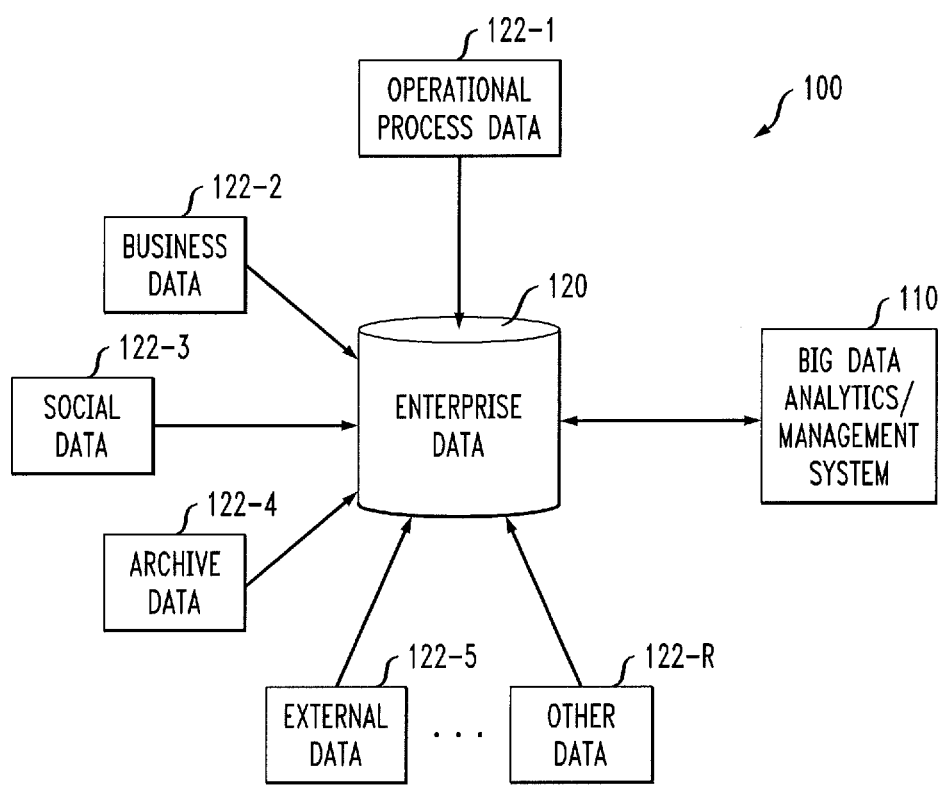
FIG. 1 shows a data analytics and management system environment, in accordance with one embodiment of the invention.

FIG. 1 shows a data analytics and management system environment, in accordance with one embodiment of the invention. As shown in system environment 100, a big data analytics and management system 110 is operatively coupled to an enterprise data store 120.

The data that comprises the enterprise data (considered in illustrative embodiments to be big data due to the size of the data stored) comes from many, varied data sources. As shown, by way of example only, such data may include operational process data 122-1 (data associated with processes executed by the enterprise), business data 122-2 (data associated with business operations of the enterprise), social data 122-3 (data associated with social media of the enterprise), archive data 122-4 (older data stored by the enterprise), external data 122-5 (data external to the enterprise), and other data 122-R (which can represent one or more other types of data that can be stored as part of the enterprise data store 120). It is to be appreciated that the data stored in store 120 does not necessarily have to be enterprise data but could be data associated with any other purpose.

The big data analytics and management system 110 provides administrators and other users with the ability to analyze, as well as manage, all or portions of the enterprise data stored in store 120. Data analytics and management functions may include, but are not limited to, data mining, data inspection, data transformation and/or data modeling. Performance of such functions allows the administrators/users to discover useful information, assist in decision making and/or draw conclusions.

Although the components 110 and 120 are shown as separate in FIG. 1, these components or portions thereof may be implemented at least in part on a common processing platform. In other embodiments, components 110 and 120 may each be implemented on a separate processing platform. It is also to be understood that a given embodiment may include multiple instances of the components 110 and 120, although only single instances of such components are shown in the system diagram for clarity and simplicity of illustration.

Figure 2:
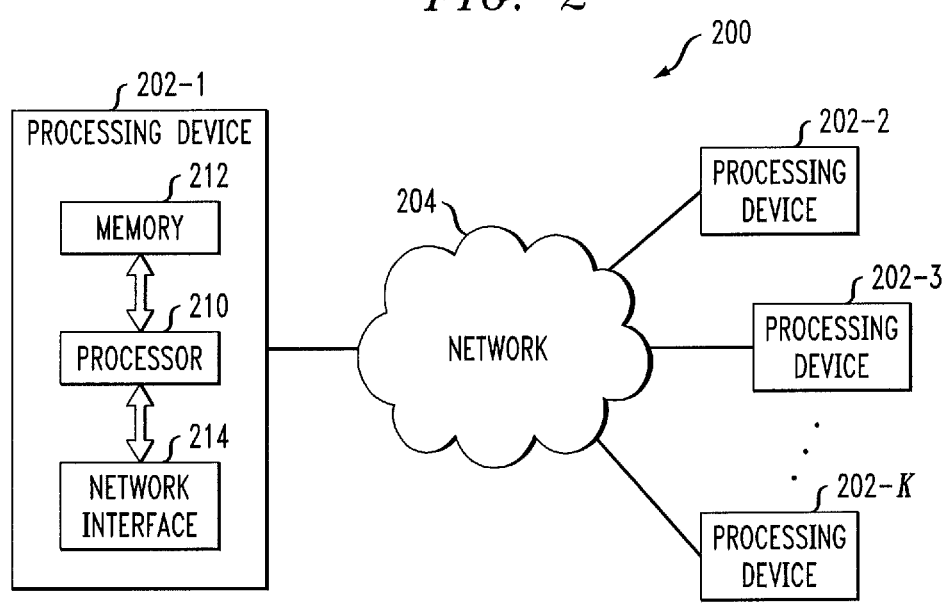
FIG. 2 shows a distributed processing platform on which the data analytics and management system of FIG. 1 is implemented, in accordance with one embodiment of the invention.

An example of a processing platform on which the system environment 100 of FIG. 1 may be implemented is information processing platform 200 shown in FIG. 2. The processing platform 200 in this embodiment comprises a plurality of processing devices, denoted 202-1, 202-2, 202-3, . . . 202-K, which communicate with one another over a network 204. One or more of the data sources 122-1 through 122-R, the enterprise data store 120, and the data analytics and management system 110 may each run on a server, computer or other processing platform element, which may be viewed as an example of what is more generally referred to herein as a "processing device." Note that one or more processing devices in FIG. 2 may be servers, while one or more processing devices may be client devices. As illustrated in FIG. 2, such a device generally comprises at least one processor and an associated memory, and implements one or more functional modules for controlling features of the system environment 100. Again, multiple elements or modules may be implemented by a single processing device in a given embodiment.

The processing device 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 210. Memory 212 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 212 may comprise electronic memory such as random access memory (RAM), read-only memory (ROM) or other types of memory, in any combination. The one or more software programs when executed by a processing device such as the processing device 202-1 causes the device to perform functions associated with one or more of the elements/components of system environment 100. One skilled in the art would be readily able to implement such software given the teachings provided herein. Other examples of processor-readable storage media embodying embodiments of the invention may include, for example, optical or magnetic disks.

Processing device 202-1 also includes network interface circuitry 214, which is used to interface the device with the network 204 and other system components. Such circuitry may comprise conventional transceivers of a type well known in the art.

The other processing devices 202 of the processing platform 200 are assumed to be configured in a manner similar to that shown for computing device 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 200 may include additional or alternative processing platforms, as well as numerous distinct processing platforms in any combination.

Also, numerous other arrangements of servers, clients, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the processing platform 200 of FIG. 2 can comprise virtual machines (VMs) implemented using a hypervisor. A hypervisor is an example of what is more generally referred to herein as "virtualization infrastructure." The hypervisor runs on physical infrastructure. As such, the data analytics and management techniques illustratively described herein can be provided in accordance with one or more cloud services. The cloud services thus run on respective ones of the virtual machines under the control of the hypervisor. Processing platform 200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 200 in one or more embodiments of the invention is the VMware vSphere® (VMware Inc. of Palo Alto, Calif.) which may have an associated virtual infrastructure management system such as the VMware vCenter®. The underlying physical infrastructure may comprise one or more distributed processing platforms that include storage products such as VNX® and Symmetrix VMAX®, both commercially available from EMC Corporation of Hopkinton, Mass. A variety of other computing and storage products may be utilized to implement the one or more cloud services that provide the data analytics and management functionality and features described herein.

Embodiments of the invention realize that data provenance is an important part of data management. "Data provenance" as used herein refers to the ability to trace and verify the creation, movement, use and/or alteration of data. Such tracing and verifying can be done through the use of meta data which provides the ability to determine and manage the lineage of data. Data lineage or provenance can be employed for many use cases including, but not limited to, data quality control, data audit, quota management, and replication management. However, it is further realized that data lineage or provenance is a missing part of existing big data analytics and management systems.

Embodiments of the invention enable data provenance in a big data analytics and management system. For example, assume a centralized big data management/analytics cluster in a large, globally-distributed corporation. Further assume that there are various business units that are using this cluster to persistent critical business data and perform various kinds of analytics jobs. To be more specific, in one example, this cluster could be a Hadoop cluster with hundreds/thousands of processing nodes. Such processing nodes are typically implemented as a large group of commodity computing machines (e.g., servers). The data stored in this cluster may be shared across the entire organization, and analytic jobs performed thereon generate new data which is stored in the same cluster. A Hadoop cluster is an example of what is known as a Massively Distributed Computing Platform (MDCP).

Existing big data management/analytic systems may use leverage-specific data as input for an analytics job, however, the input data may already be out of date. Another disadvantage of existing systems is that similar, even identical, analytic jobs may be kicked off on the same data by different business units, but the output data is stored in different places which is a waste of disk space. Advantageously, embodiments of the invention provide techniques that enable management of data provenance/lineage information inside a big data management/analytic system, which brings significant benefits to enterprise users.

Figure 3:
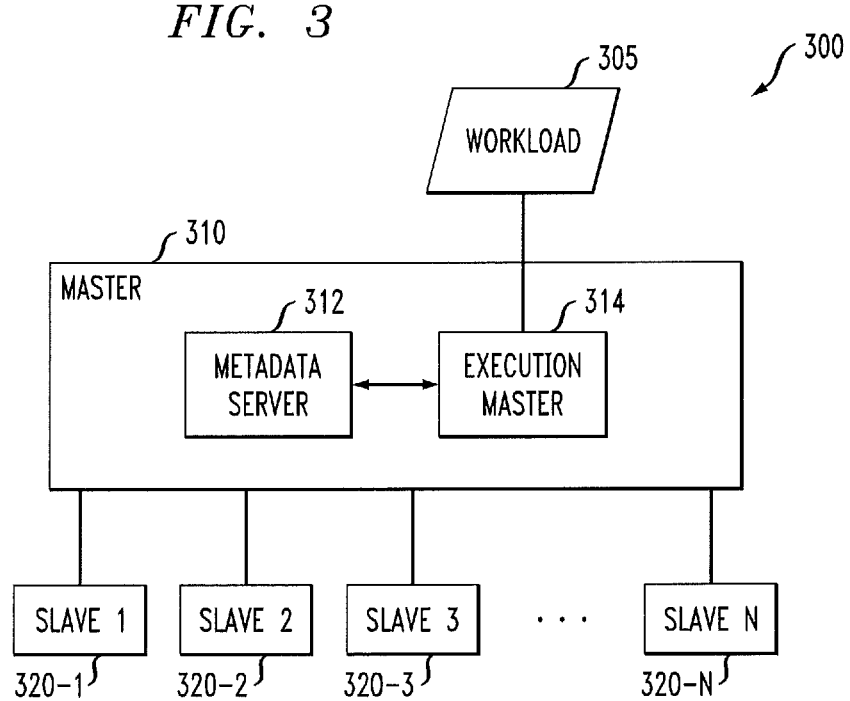
FIG. 3 shows a data analytics and management system, in accordance with one embodiment of the invention.

FIG. 3 shows a data analytics and management system, in accordance with one embodiment of the invention. The system 300 in FIG. 3 is one example of big data analytics and management system 110 in FIG. 1. It is assumed that the system is comprised of a cluster of processing nodes (all or part of an MDCP), where the nodes are configured to alternatively function as either a master node (master) or a slave node (slave). A master is typically able to modify data (i.e., respond to a write instruction, e.g., an instruction to change/update data stored in a database), while a slave is typically only able to return data (i.e., respond to a read instruction, e.g., an instruction to return data stored in a database).

In one embodiment of the invention, as illustrated in FIG. 3, a master 310 is configured to provide two services, a meta data service 312 (meta data server) and an analytics execution service 314 (execution master). Multiple slaves 320-1, 320-2, 320-3, . . . , 320-N are shown operatively coupled to master 310.

The meta data service 312 manages meta data of the data (e.g., enterprise data 120), which may be stored in accordance with a distributed file system (not expressly shown but understood to be part of the big data analytics and management system 110). For example, the meta data could be namespace information and data lineage (provenance) information.

The execution master 314 controls the execution of analytic jobs. The execution master 314 manages local/distributed workload 305 across the cluster of nodes. Before the execution of a workload 305, the execution master 314 contacts the meta data server 312 for meta data of the input data. After the execution of a workload 305, the execution master 314 contacts the meta data server 312 to register the meta data of the output data. An example of these steps will be further explained in detail below.

Figure 4:
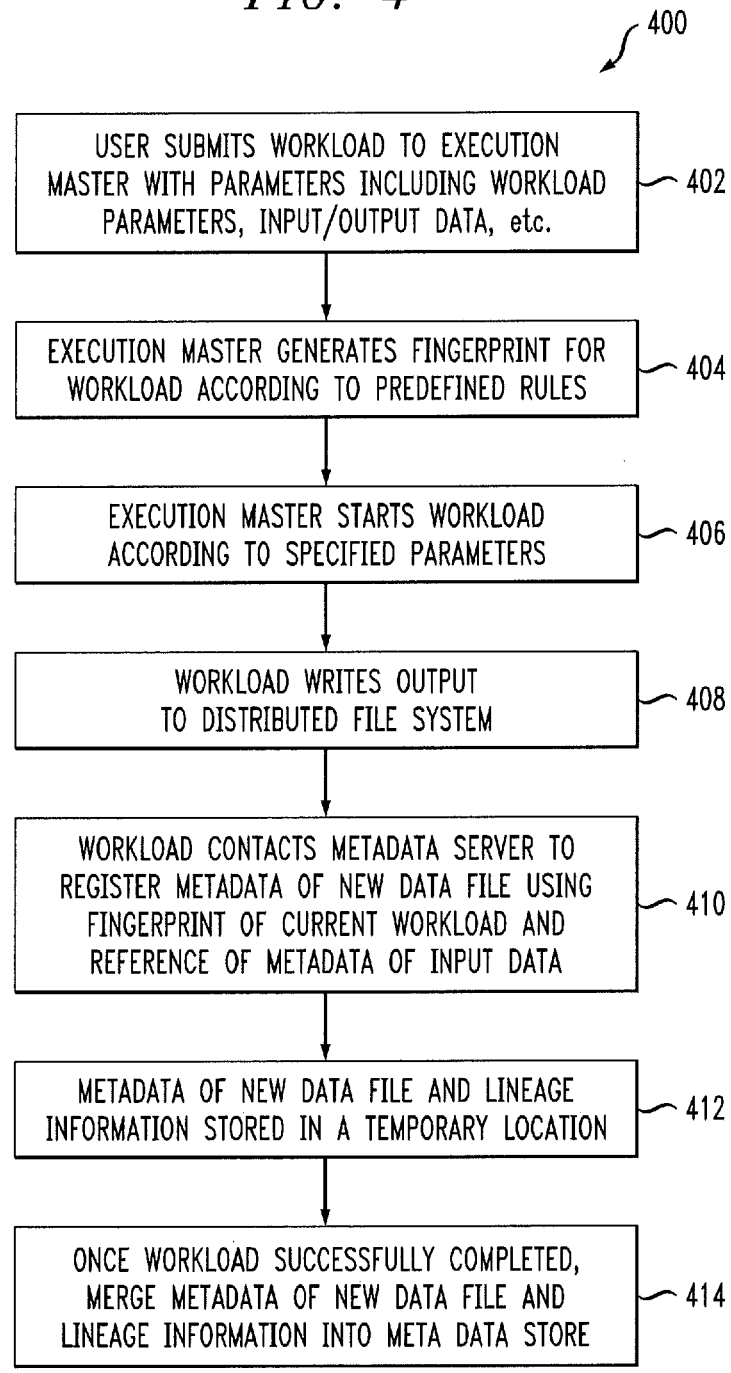
FIG. 4 shows a methodology for managing lineage information in a data analytics and management system, in accordance with one embodiment of the invention.

FIG. 4 shows a methodology 400 for managing lineage information in a data analytics and management system, in accordance with one embodiment of the invention. It is assumed the methodology 400 is performed in accordance with the system 300 in FIG. 3.

In step 402, a user submits a workload to execution master 314 with parameters which include workload parameters, input/output data, etc. By way of example only, the parameters could be a uniform resource locator (URL) of an input data set, a URL of an analytics program (wherein an analytics program is one example of what is known as an "executable"), and an output location (e.g., a URL or an object-based storage system).

In step 404, the execution master 314 generates a fingerprint for this workload according to predefined rules. In one example, a unique fingerprint is generated for every execution. In an alternative embodiment, the fingerprint is generated according to the executable and the input data. In this alternative embodiment, the same workload is given the same fingerprint. By way of example, the execution master 314 ingests/scans the input data set and creates a content address (e.g., an MD-5 (Message Digest) or SHA (Secure Hash Algorithm) hash value) that uniquely identifies the input. This can similarly be done for the analytics program. This creates two unique values, each of which is considered a fingerprint. Alternatively, the two values can be combined to create one, unique workload fingerprint.

In step 406, the execution master 314 starts execution of the workload 305 according to the parameters specified by the workload.

In step 408, during execution of the workload 305, the workload writes output data (e.g., new data file) to the distributed file system.

In step 410, the workload 305 (via the execution master 314) contacts the meta data server 312 to register the meta data of the new data file. In one embodiment, the meta data of the new data file is registered by the workload at the meta data server 312 using: (i) the fingerprint of the current workload; and/or (ii) a reference assigned to the meta data associated with the corresponding input data used to generate the output data. Note that either (or both) of the sets can be used as the reference.

In step 412, the meta data of the new data file and the lineage information is stored in a temporary location. While the lineage information can be separate from any other meta data, the lineage information is considered part of the meta data in illustrative embodiments. For example, the metadata of the new data file contains lineage information (e.g., including, but not limited to, the fingerprints of the workload, or the input data/executable fingerprints). The meta data can be stored either with the file (e.g., an object-based approach) or in the meta data server 312.

In step 414, once execution of the workload 305 is successfully completed, the data (if initially temporarily filed) is merged into a meta data store (which is part of the meta data server 312).

Figure 5:
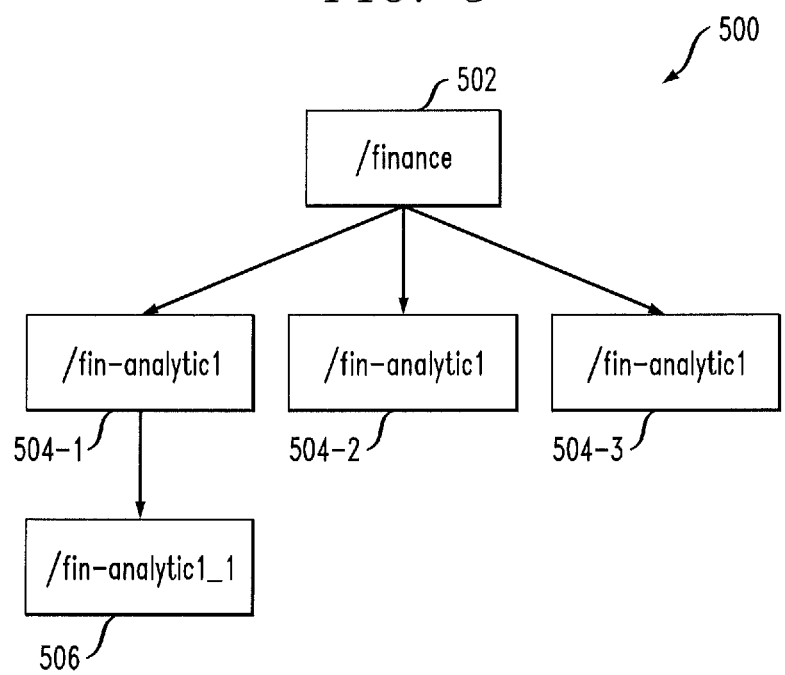
FIG. 5 shows a data analytic result hierarchy, in accordance with one embodiment of the invention.

In one embodiment, the lineage information is stored with both parent and child meta data. FIG. 5 shows a data analytic result hierarchy 500, that results from execution of a workload, with a parent data file 502 (/finance), child data files 504-1 (/fin-analytic1), 504-2 (/fin-analytic1) and 504-3 (/fin-analytic1) extending from parent data file 502, and child data file 506 (/fin-analytic1_1) extending from child data file 504-1. Thus, in hierarchy 500, big data analytic results are shown which share a single ancestor input file 502.

Assume now, for some reason, the ancestor input file 502 is updated (one possible reason is that some new data is introduced by the execution master 314). This means that the analytic results of the descendants (504-1, 504-2, 504-3 and 506) are no longer up to date (i.e., no longer correct/precise). In existing big data analytics and management systems, it is difficult, if not impossible, to fully trace the descendants. However, embodiments of the invention enable such tracking functions.

In another example, lineage information generated in accordance with embodiments of the invention can be used by the execution master 314 for workload scheduling. When the user submits a new workload, the execution master 314 queries the workload fingerprint/input data lineage information from the meta server 312. If there is any existing results that satisfy the query, the output data is returned directly to the user, and unnecessary computation is avoided.

In another example, similar to the above example, lineage information generated in accordance with embodiments of the invention can be used for de-duplication. For example, when two different users submit workload with the same fingerprint, there could be two different sets of meta data which point to the same raw data. Embodiments of the invention thus bring significant benefits in a multi-tenancy environment.

In yet another example, lineage information generated in accordance with embodiments of the invention can be used to describe the data provenance. For example, meta data from lineage is used to describe the history of the result, which is useable to ensure data integrity and the accuracy of associated calculations. Further, the workload could be replayed by following the footprint derived from lineage meta data, which means the abstract and aggregated result could be validated.

The following is a non-limiting example of a use case according to one embodiment of the invention. Consider a group of spreadsheets of financial data being analyzed and rolled into a quarterly report. Each spreadsheet has a fingerprint, and assume there is one executable that takes 20 spreadsheets and generates a quarterly result graph. This quarterly graph has a companion lineage file which points to the 20 input documents and the executable program. This data is stored in the meta data server 312. Assume an executive of the enterprise points at the quarterly result and notices that it is wrong. The system goes to the meta data server 312 and traces back to the original inputs and algorithms, finds the problem, fixes either the data or the executable, and re-runs the analysis, thus creating a different lineage branch in the meta data server 312.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising steps of:

obtaining an input data set and a first data analytics workload, wherein the first data analytics workload comprises one or more execution parameters for executing the first data analytics workload based on the input data set, and wherein the execution parameters comprise a location of the input data set;

obtaining an identifier specific to the first data analytics workload according to one or more predefined rules, wherein obtaining the identifier comprises creating at least one content address according to and uniquely identifying both of the input data set and the one or more execution parameters to generate the identifier;

commencing execution of the first data analytics workload based on the one or more execution parameters and the input data set, wherein the first data analytics workload writes output data generated during the execution of the first data analytics workload;

registering meta data associated with the output data generated during the execution of the first data analytics workload at a meta data store using said at least one identifier, wherein the meta data comprises lineage information for tracing and verifying at least one of creation, movement, use and alteration of the output data generated during execution of the first data analytics workload based at least in part on said identifier;

storing the meta data associated with the output data temporarily in a temporary store prior to completing execution of the first data analytics workload, wherein the lineage information is stored with both parent meta data associated with a parent file and child meta data associated with one or more child data files associated with the parent file;

merging the temporarily stored meta data from the temporary store into the meta data store upon completing execution of the first data analytics workload; and performing one or more functions utilizing the lineage information from the merged meta data, the one or more functions comprising one or more of a data provenance function, a data analytics work scheduling function, and a data de-duplication function;

wherein performing the data provenance function comprises replaying the first data analytics workload by tracking a footprint derived from the lineage information to validate the output data generated during the execution of the first data analytics workload;

wherein performing the data analytics workload scheduling function comprises querying the meta data server to locate the lineage information responsive to re-obtaining the first data analytics workload, and returning data from an enterprise data store without re-executing the first data analytics workload responsive to locating the lineage information;

wherein performing the data de-duplication function comprises, responsive to obtaining the first data analytics workload and a second data analytics workload, comparing the first identifier with a second identifier specific to the second data analytics workload and, responsive to the first identifier matching the second identifier, registering the first and second data analytics workloads to point to common data; and wherein one or more of the above steps are performed via at least one processing device.

2. The method of claim 1, wherein the at least one processing device is part of a distributed computing platform.

3. The method of claim 2, wherein the distributed computing platform is a massively distributed computing platform.

4. An article of manufacture comprising a processor-readable storage medium having encoded therein executable code of one or more software programs, wherein the one or more software programs when executed by the at least one processing device implement the steps of the method of claim 1.

5. The method of claim 1, wherein the lineage information is stored in a data analytics result hierarchy, wherein the data analytics hierarchy comprises first meta data for a first input data file and at least second meta data extending from the first meta data for at least a second input data file, the second input data file being part of the input data set of the data analytics workload.

6. The method of claim 5, further comprising updating the output data generated during execution of the data analytics workload responsive to identifying a change to the first input data file.

7. An apparatus, comprising:
a memory; and
a processor operatively coupled to the memory and configured to:
obtain an input data set and a first data analytics workload, wherein the first data analytics workload comprises one or more execution parameters for executing the first data analytics workload based on the input data set, and wherein the execution parameters comprise a location of the input data set;
obtain an identifier specific to the first data analytics workload according to one or more predefined rules, wherein, in obtaining the identifier, the processor is configured to create at least one content address according to and uniquely identifying both of the input data set and the one or more execution parameters to generate the identifier;
commence execution of the first data analytics workload based on the one or more execution parameters and the input data set, wherein the data analytics workload writes output data generated during the execution of the first data analytics workload;
register meta data associated with the output data generated during the execution of the first data analytics workload at a meta data store using said at least one identifier, wherein the meta data comprises lineage information for tracing and verifying at least one of creation, movement, use and alteration of the output data generated during execution of the first data analytics workload based at least in part on said identifier;
store the meta data associated with the output data temporarily in a temporary store prior to completing execution of the first data analytics workload, wherein the lineage information is stored with both parent meta data associated with a parent file and child meta data associated with one or more child data files associated with the parent file;
merge the temporarily stored meta data from the temporary store into the meta data store upon completing execution of the data analytics workload; and
perform one or more functions utilizing the lineage information from the merged meta data, the one or more functions comprising one or more of a data provenance function, a data analytics work scheduling function, and a data de-duplication function;
wherein, in performing the data provenance function, the processor is configured to replay the first data analytics workload by tracking a footprint derived from the lineage information to validate the output data generated during the execution of the first data analytics workload;
wherein, in performing the data analytics workload scheduling function, the processor is configured to query the meta data server to locate the lineage information responsive to re-obtaining the first data analytics workload, and return data from an enterprise data store without re-executing the first data analytics workload responsive to locating the lineage information; and
wherein, in performing the data de-duplication function, the processor is configured to, responsive to obtaining the first data analytics workload and a second data analytics workload, compare the first identifier with a second identifier specific to the second data analytics workload and, responsive to the first identifier matching the second identifier, register the first and second data analytics workloads to point to common data.

8. The apparatus of claim 7, wherein the processor is part of a distributed computing platform.

9. The apparatus of claim 8, wherein the distributed computing platform is a massively distributed computing platform.

10. The apparatus of claim 7, wherein the lineage information is stored in a data analytics result hierarchy, wherein the data analytics hierarchy comprises first meta data for a first input data file and at least second meta data extending from the first meta data for at least a second input data file, the second input data file being part of the input data set of the data analytics workload.

11. The apparatus of claim 10, further comprising updating the output data generated during execution of the data analytics workload responsive to identifying a change to the first input data file.

12. A system, comprising:
a meta data server; and
an execution master node operatively coupled to the meta data server and configured to:
obtain an input data set and a first data analytics workload, wherein the first data analytics workload comprises one or more execution parameters for executing the first data analytics workload based on the input data set, and wherein the execution parameters comprise a location of the input data set;
obtain an identifier specific to the first data analytics workload according to one or more predefined rules, wherein, in obtaining the identifier, the execution master node is configured to create at least one content address according to and uniquely identifying both of the input data set and the one or more execution parameters to generate the identifier;

commence execution of the first data analytics workload based on the one or more execution parameters and the input data set, wherein the data analytics workload writes output data generated during the execution of the first data analytics workload;

register meta data associated with the output data generated during the execution of the first data analytics workload at a meta data store using said at least one identifier, wherein the meta data comprises lineage information for tracing and verifying at least one of creation, movement, use and alteration of the output data generated during execution of the first data analytics workload based at least in part on said identifier;

store the meta data associated with the output data temporarily in a temporary store prior to completing execution of the first data analytics workload, wherein the lineage information is stored with both parent meta data associated with a parent file and child meta data associated with one or more child data files associated with the parent file;

merge the temporarily stored meta data from the temporary store into the meta data store upon completing execution of the data analytics workload; and perform one or more functions utilizing the lineage information from the merged meta data, the one or more functions comprising one or more of a data provenance function, a data analytics work scheduling function, and a data de-duplication function;

wherein, in performing the data provenance function, the execution master node is configured to replay the first data analytics workload by tracking a footprint derived from the lineage information to validate the output data generated during the execution of the first data analytics workload;

wherein, in performing the data analytics workload scheduling function, the execution master node is configured to query the meta data server to locate the lineage information responsive to re-obtaining the first data analytics workload, and return data from an enterprise data store without re-executing the first data analytics workload responsive to locating the lineage information; and wherein, in performing the data de-duplication function, the execution master node is configured to, responsive to obtaining the first data analytics workload and a second data analytics workload, compare the first identifier with a second identifier specific to the second data analytics workload and, responsive to the first identifier matching the second identifier, register the first and second data analytics workloads to point to common data.

13. The system of claim 12, further comprising one or more slave nodes operatively coupled to the meta data server and the execution master node.

14. The system of claim 12, wherein the execution master node is part of a distributed computing platform.

15. The system of claim 14, wherein the distributed computing platform is a massively distributed computing platform.

16. The system of claim 12, wherein the lineage information is stored in a data analytics result hierarchy, wherein the data analytics hierarchy comprises first meta data for a first input data file and at least second meta data extending from the first meta data for at least a second input data file, the second input data file being part of the input data set of the data analytics workload.

17. The system of claim 16, further comprising updating the output data generated during execution of the data analytics workload responsive to identifying a change to the first input data file.

* * * * *